United States Patent Office 2,855,687
Patented Oct. 14, 1958

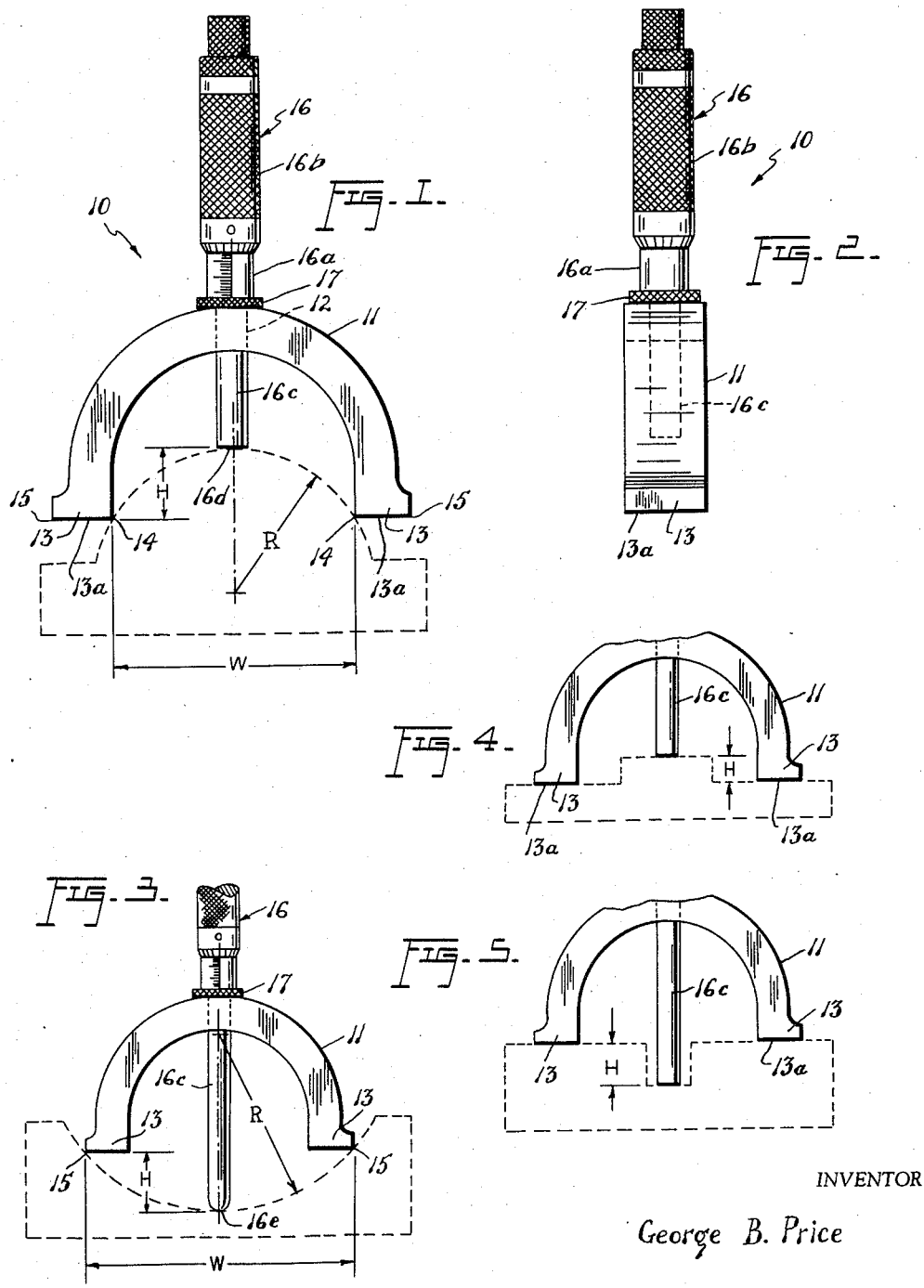

2,855,687
MEASURING INSTRUMENTS

George B. Price, Fort Worth, Tex., assignor of one-half to Jack B. Lusk, Sidney, Tex.

Application January 18, 1955, Serial No. 482,556

1 Claim. (Cl. 33—170)

This invention relates to new and useful improvements and structural refinements in precision measuring instruments or gauges, and the principal object of the invention is to facilitate convenient and expeditious measurement of distance in terms of depth, height, concavity, convexity, and the like, whereby the invention may be effectively employed as a depth gauge, a radius gauge, as well for other similar gauging operations.

More specifically, the invention contemplates the provision of a measuring instrument having a frame provided with a pair of spaced work engaging members, together with a micrometer carried by the frame and including a movable measuring spindle which coacts with the work engaging members in determining the measurement being taken.

Some of the advantages of the invention reside in its simplicity of construction and operation, in its durability and in its adaptability to economical manufacture.

With the above more important objects and features in view and such other objects and features as may become apparent as this specification proceeds, the invention resides in the arrangement of parts and details of construction substantially as shown in the accompanying drawing, wherein like characters of reference are used to designate like parts and wherein:

Figure 1 is a front elevational view of the invention illustrated in use for measuring convexity;

Figure 2 is a side elevational view of the invention per se;

Figure 3 is a fragmentary front elevational view of the invention as used in measuring concavity;

Figure 4 is a fragmentary elevational view of the invention as used for measuring height; and Figure 5 is a fragmentary elevational view of the invention as used for measuring depth.

With reference now to the accompanying drawing in detail, more particularly to Figures 1 and 2 thereof, the invention consists of a precision measuring instrument designated by the general reference numeral 10, the same embodying in its construction an inverted, substantially U-shaped frame 11 having a bight portion provided with a central bore 12. The end portions of the frame 11 are suitably enlarged so as to afford a pair of transversely spaced rectangular block-shaped work engaging members 13 having selectively usable inner and outer work engaging edges 14, 15, respectively.

A micrometer assembly 16 of a substantially conventional type is carried by the frame 11, this being achieved by suitably securing the usual barrel 16a of the micrometer assembly in the aforementioned bore 12. For this purpose, the barrel 16a may be press-fitted in the bore, or alternatively, the bore and the barrel may be screw-threaded and a suitable lock nut 17 provided on the barrel to lock against the bight portion of the frame.

In any event, the micrometer assembly also includes the usual thimble 16b and an axially movable measuring spindle 16c, it being noted that while the thimble 16b projects outwardly from the frame 11, the spindle 16c extends witihn the frame and is projectable and retractable through the space between the work engaging members 13. The spindle 16c has a work engaging end or point 16d.

When the invention is to be used, such as for example, in determining the radius R of convexity as shown in Figure 1, the instrument is applied to the work 18 so that the latter is engaged by the inner edges 14 of the members 13. Thereupon the thimble 16b is turned until the point 16d of the spindle 16c touches the work. In this manner the work is contacted by the instrument at three circumferentially spaced points, and the reading of the micrometer may then be taken to determine the distance of the point 16d above the lower faces 13a of the members 13, in other words, the dimension H. With the transverse spacing W between the work engaging members 13 being constant, the radius of convexity R may then be readily computed by a simple, well known formula:

$$R = \frac{W^2 + 4H^2}{8H}$$

In order to obviate the need for an individual computation with each measurement, a suitable table may be provided, showing the various values of R for different values of H with the constant W for each gauge, and for different values of W where several gauges of different widths are to be used.

When the invention is to be used for measuring the radius of concavity as shown in Figure 3, the same procedure is followed with exception that the outer edges 15, rather than the inner edges 14, are employed for contacting the work. Moreover, if the radius of concavity of the work is small, the point of the micrometer spindle may be rounded as indicated at 16e.

Figure 4 illustrates the invention in use for measuring the height of a protuberance on the work, while Figure 5 shows the device in use as a depth gauge. In both these instances direct readings, of course, may be taken from the micrometer itself.

While in the foregoing there has been described and shown the preferred embodiment of the invention, various modifications may become apparent to those skilled in the art to which the invention relates. Accordingly, it is not desired to limit the invention to this disclosure and various modifications may be resorted to, such as may lie within the spirit and scope of the appended claim.

What is claimed as new is:

A measuring instrument comprising an inverted U-shaped frame provided in its bight portion with a centrally disposed screw-threaded cylindrical bore, a pair of rectangular block-shaped work engaging members provided in transversely spaced relation at the ends of said frame, said work engaging members having flat inner and outer faces parallel to the axis of said bore and flat coplanar lower surfaces extending from said inner to said outer faces, the inner faces of said members being flush with the inner edge of said frame and the outer faces thereof being spaced laterally outwardly from the outer edge of the frame, said inner and outer faces coacting with said lower surfaces to provide respectively inner and outer lower corner edges engageable selectively with the work, and a micrometer including a screw-threaded barrel engaging the screw-threaded bore in said frame, a lock nut provided on said barrel in abutment with the outer edge of the bight portion of the frame, and a measuring spindle movable longitudinally in said barrel, said spindle having a semi-spherical work engaging point retractable above and projectable below the lower surfaces and lower corner edges of said members.

References Cited in the file of this patent

UNITED STATES PATENTS

| | | |
|---|---|---|
| 597,335 | Spalding | July 11, 1898 |
| 1,020,020 | Brawley | Mar. 12, 1912 |
| 1,127,955 | Berthold | Feb. 9, 1915 |
| 1,614,005 | Lewis | Jan. 11, 1927 |
| 1,637,408 | Bugbee | Aug. 2, 1927 |
| 1,656,302 | Swaney | Jan. 17, 1928 |
| 2,572,999 | Ellicott | Oct. 30, 1951 |